July 26, 1960 S. A. SCHERBATSKOY 2,946,888
NUCLEAR MEASURING SYSTEM
Filed May 2, 1955 4 Sheets-Sheet 2
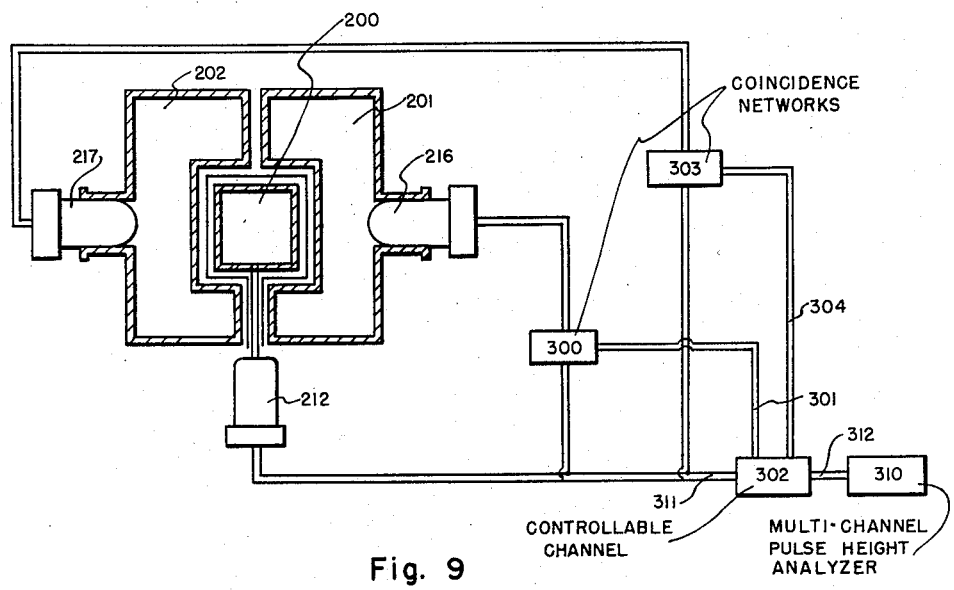
Fig. 9
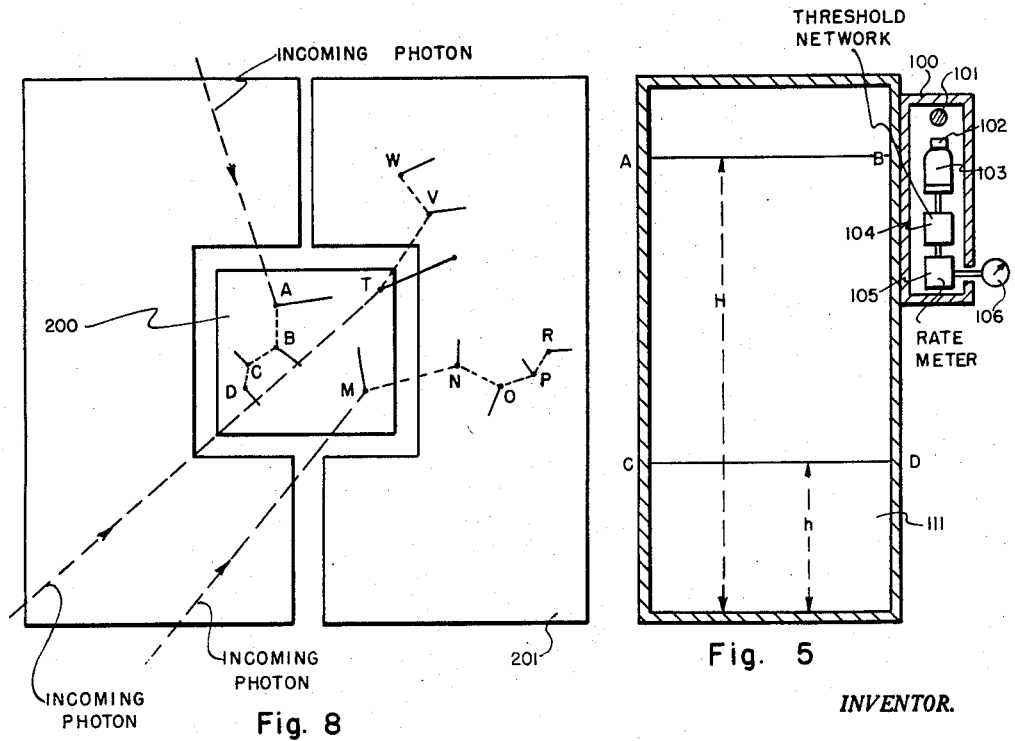
Fig. 8
Fig. 5
*INVENTOR.*

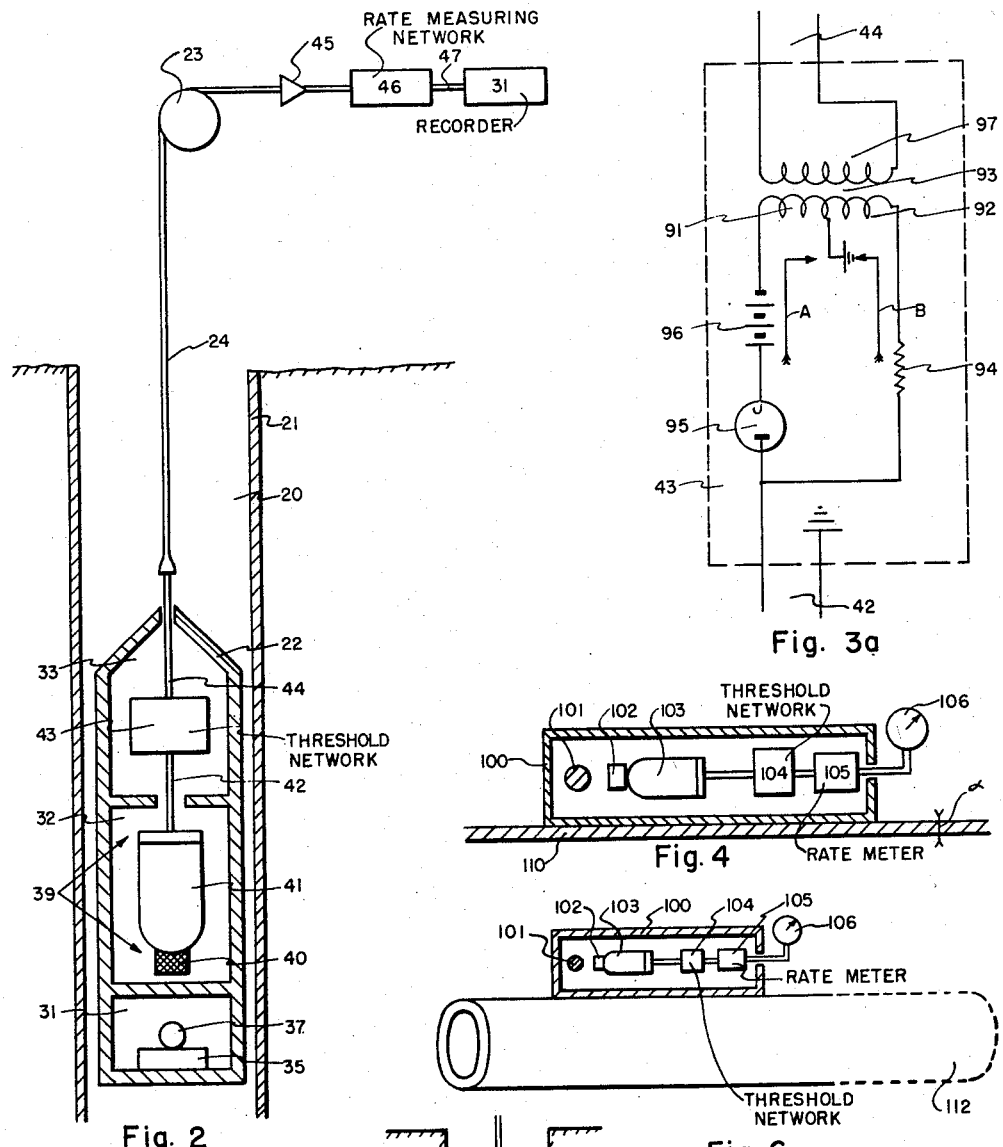

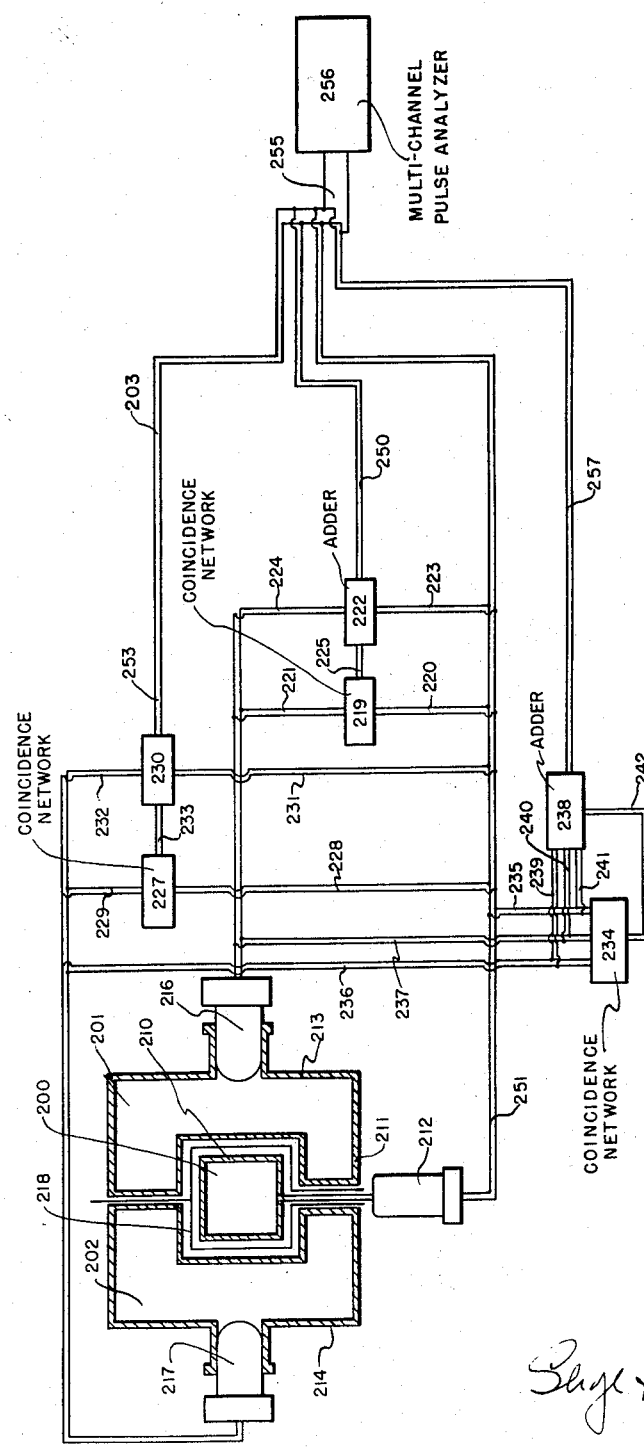

July 26, 1960

S. A. SCHERBATSKOY 2,946,888

NUCLEAR MEASURING SYSTEM

Filed May 2, 1955

INVENTOR.

Serge A Scherbatskoy

United States Patent Office 2,946,888
Patented July 26, 1960

2,946,888

NUCLEAR MEASURING SYSTEM

Serge A. Scherbatskoy, 804 Wright Bldg., Tulsa, Okla.

Filed May 2, 1955, Ser. No. 505,086

10 Claims. (Cl. 250—71.5)

This invention is concerned with an apparatus for performing measurements of radiations resulting from nuclear transformations within an unknown substance the characteristics of which it is desired to determine. The nuclear transformations can be caused by an external agent such as a neutron source placed adjacent to the substance and in the neighborhood of a suitable detecting instrument.

Various specific objects of my invention and the details of its operation will be specifically described in connection with the accompanying drawings in which:

Fig. 1 shows schematically a device for performing measurements in a bore hole in the earth as practiced in the prior art.

Fig. 2 shows schematically the application of my measuring system for operation in a bore hole.

Fig. 3a shows a threshold network for transmitting impulses below a determined threshold value.

Fig. 3b shows a threshold network for transmitting impulses above a determined threshold value.

Fig. 4 shows the application of the principles of my invention for determining the thickness of a plate.

Fig. 5 shows the application of the principles of my invention for determining the level of a liquid in a tank.

Fig. 6 shows the application of the principle of my invention for determining the density of fluid within a pipe line.

Fig. 7 shows the assembly of crystals to be used in connection with Fig. 2 to produce pulses having magnitudes proportional to the energy of incoming photons.

Fig. 8 shows the photon tracks in a crystal assembly shown in Fig. 7.

Fig. 9 shows a modification of the arrangement shown in Fig. 7.

Figure 10A:
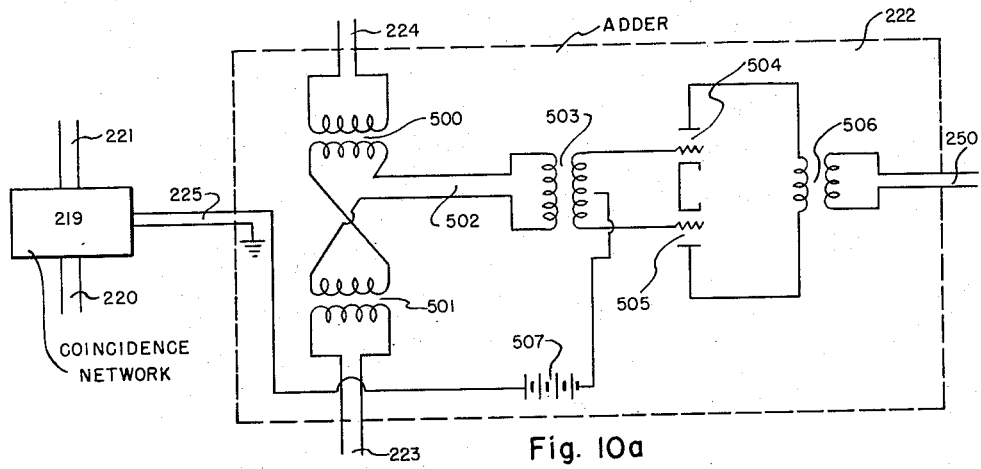
Figs. 10a and 10b show diagrammatically a controllable adding network that is part of the arrangement of Fig. 7.

Referring now particularly to Fig. 1, numeral 10 designates an exploring housing which is adapted to be lowered by means of a cable to various depths in the bore hole 11 in order to perform measurements of the formations adjacent said hole. The exploring housing contains essentially three elements: (1) a source of radiation 12 such as a source of neutrons or gamma rays that are radiated into the adjacent formation; (2) a detector 14 for detecting the radiations scattered or reflected by the formation; and (3) a shield 15 interposed between the source and the detector. The purpose of the shield is to attenuate any radiation that could follow the direct path from the source 12 to the detector 14. Thus the shield 15 is an essential element of the arrangement of the prior art since the presence of this shield makes it possible for the detector 14 to respond predominantly to the radiations reflected or scattered by the adjoining formation and to be insensitive to any direct radiations from the source 12. Therefore because of the shield 15 the output of the detector 14 can be used as an index of the properties of the adjoining formation. It is apparent that if the shield were not present, the direct radiations from the source to the detector would be intense, and any useful effect due to the radiations scattered and reflected by the adjoining formation would be completely lost and masked by the effect of the source.

In the prior art the presence of the shield introduced a certain inflexibility in the design of the subsurface exploring instrument; namely, the source 12 could not be placed arbitrarily with respect to the detector 14, since there had to be a certain minimum distance $d'$ between the detector and the source that was sufficient for the insertion of the shield 15.

In many instances, however, it is desirable, particularly in logging relatively thin formations, to place the radiation source adjacently to the detector. This can be accomplished in accordance with my present invention by eliminating entirely the shield and utilizing as detector a proportional counter, that is adapted to produce impulses that are proportional to the energy of the intercepted radiation particles or quanta. It is well known that the radiation that follows the direct path from the source to the detector is different in energy (and in some instances in character) from the radiation that is scattered by or induced in the formation. Accordingly, I provide across the output terminals of the proportional counter a pulse height analyzer that selectively transmits only the impulses within an energy range corresponding to radiation scattered or induced in the formation and selectively attenuates the impulses within an energy range corresponding to the radiation that is directly transmitted from the source to the detector. It is thus apparent that such a pulse height analyzer makes a shield unnecessary and makes it possible to place the source of radiation in any desired position with respect to the detector.

Referring now to Fig. 2, there is schematically illustrated a drill hole 20 penetrating the formations to be explored. The drill hole is provided in conventional manner with a tubular metallic casing designated 21. For the purpose of exploring the formations along the bore hole there is provided in accordance with the present invention exploration apparatus comprising a housing 22 which is lowered into the bore hole 21 by means of a cable 24. The cable 24 has a length somewhat in excess of the depth of the bore hole to be explored and is normally wound on a drum to lower the exploring apparatus into the bore hole 20 and may be rewound upon the drum to raise the exploring apparatus.

In order to determine the depth of the exploratory apparatus within the bore hole, measuring wheel 23 is provided which measures the depth in a conventional manner.

The housing of the exploratory apparatus is divided into three sections designated by numerals 31, 32, and 33, respectively. In the section 31 there is provided a solid support 35 on which is disposed a suitable source of radiation 37 to be described hereafter.

The section 32 comprises a scintillation counter 39 consisting of a crystal 40 and a photomultiplier 41.

The crystal 40 may be of anthracene, sodium iodide, or sodium tungstate or of any other substance adapted to produce light as a result of interaction with incident photons. As it is well known, an incident photon interacting with the crystal undergoes multiple scattering and contributes a portion of its energy to Compton scattering at each scattering point. It is desirable for the incident photon to be completely absorbed by the crystal, since only then will the amount of light produced in the crystal be proportional to the photon's energy. The complete absorption of the gamma ray within the crystal can be accomplished by selecting a sufficiently large crystal. The light produced in the crystal as a result of interaction with the gamma ray subsequently impinges upon a photomultiplier 41 to produce a current impulse proportional to the energy of the intercepted gamma ray.

The output of the photomultiplier 41 is in turn applied to the input terminals 42 of a threshold network designated schematically by block 43 and located in the compartment 33. The output of the threshold network is in turn connected to the cable 24. An amplifier 45 is connected to the surface end of the cable 24. The output of the amplifier is connected to the rate measuring network 46 which is of conventional type and is adapted to produce across its output terminals 47 a D.C. voltage having a magnitude representing the frequency of occurrence of the impulses applied to its input. The output of the rate measuring network is connected to the recorder 31.

To illustrate my invention, I shall present two examples: In the first case, 37 shall designate a source of gamma rays such as Co60 and the detector 39 will detect gamma rays scattered by the adjacent formations. In the second case, 37 shall designate a neutron source such as radium beryllium mixture and the detector 39 will detect the gamma rays resulting from the capture of neutrons by various elements that are present in the adjacent formations.

Consider now the first example based on the use of a source of gamma rays to irradiate the formations and of a detector of gamma rays to detect and measure the gamma rays scattered by the formations. In this embodiment the numeral 37 designates a Co60 source which emits gamma rays of energy about 1.2 mev. (More exactly it emits two monochromatic rays having energies 1.17 mev. and 1.33 mev.) These gamma rays arrive at the detector either as a direct radiation or as a radiation that is scattered by the adjoining formations. It is apparent that direct radiation suffers no degradation of energy and the photons that are directly emitted by the source 37 and interact with the crystal 40 produce in the output of the photomultiplier 41 impulses having magnitudes corresponding to the energy of 1.2 mev. On the other hand, those gamma rays that irradiate the adjoining formations suffer a degradation of energy since they undergo Compton scattering in which the scattered photon has only a portion of the energy of the incoming photon. Therefore, the electrons scattered by the formations interact with the crystal and since these electrons have an energy below 1.2 mev. the corresponding impulses produced by the multiplier are smaller than the impulses due to the photons following the direct path from the source 37 to the crystal 40. The threshold network 43 connected to the output of photomultiplier 41 selectively transmits only those impulses that have magnitudes smaller than M where M designates the magnitude of impulses corresponding to an energy of 1.2 mev.

The impulses having magnitudes smaller than M are transmitted by means of the cable 24 to the top of the drill hole, amplified in the amplifier 45 and applied to the rate measuring network 46. The voltage output of 46 is in turn applied to the recorder 31. Thus the variation of this voltage with the depth will be shown on the recorder 31 while the depth of the subsurface instrument in the hole will be indicated by means of the cable measuring device 23.

In the second embodiment of my invention I use a source of neutrons to irradiate the formations and a detector responsive to the gamma rays of capture emitted by said formations. Numeral 37 designates a radium beryllium preparation which may be enclosed in a container made of a suitable material such as glass. As it is well known, the radium beryllium mixture is not a pure source of neutrons since it emits a heterogeneous radiation comprising neutrons and gamma rays. The major portion of the emitted gamma rays are due to radium in equilibrium with its products and their energies are below the value of 2.5 mev.

A portion of the beam of neutrons and gamma rays emitted by the source 37 travels directly from the source to the crystal 40 and the remaining portion interacts with the adjoining formation. The crystal 40 is composed of heavy elements such as calcium tungstate and, therefore, it does not respond to fast neutrons that arrive directly from the source. It responds, however, to gamma rays and since these gamma rays have energies below 2.5 mev., the current pulses in the output of the photomultiplier having magnitude below a certain value N, said value N corresponding to energies of 2.5 mev.

The gamma radiations emitted by the source 37 undergo numerous collisions in the adjoining formations and are partly scattered towards the detector. These scattered gamma rays have energies that are lower than the primary gamma rays emitted by the source 37. Consequently the current impulses in the output of the photomultiplier 41 that are due to the scattered gamma rays are smaller than the above referred to value N.

The high energy neutrons emitted by the source 37 are slowed down to thermal velocities and then diffuse a distance which is determined by the abundance and capture cross sections of the elements present and eventually becomes absorbed by various elements. Upon the absorption of a thermal neutron, each element emits a gamma ray called gamma ray of capture and having an energy characterizing a given element. For instance, an atom of hydrogen by capturing a neutron emits a gamma ray of energy 2.2 mev., an atom of nitrogen by capturing a neutron emits a gamma ray of energy 10.78 mev., an atom of aluminum by capturing a neutron emits a gamma ray of energy 8 mev.

It should be noted that hydrogen emits a gamma ray of capture having energy smaller than 2.5 mev., and that all other elements emit gamma rays of capture having energies higher than 2.5 mev. Thus the current impulses having magnitudes smaller than N correspond to neutron capture by hydrogen and those having magnitudes larger than N correspond to capture by all remaining elements.

The threshold network 43 connected to the output of the photomultiplier 41 is adapted to transmit selectively only those impulses that exceed the value N and selectively attenuate the impulses smaller than N. The impulses exceeding the value N are transmitted by means of the cable 24 to the top of the drill hole, amplified in the amplifier 45 and applied to the rate measuring network 46. The voltage output of 46 is in turn applied to the recorder 31.

The threshold network 43 is used to perform the following functions: (1) to selectively attenuate and eliminate gamma rays that arrive directly from the source to the detector, i.e. to eliminate the shield customarily used to shield the source from the detector; and (2) to selectively attenuate and eliminate from the recording the gamma rays of capture due to hydrogen so as to produce a log representing the relative abundance of heavy elements; and (3) to selectively attenuate and to eliminate from the recording gamma rays that are emitted by the naturally radioactive elements present in the formation since these gamma rays have energies below 2.5 mev. It is thus apparent that I have provided in my second embodiment a log representing the relative abundance of all elements heavier than hydrogen that are present in the formations surrounding the bore hole.

Figs. 3a and 3b show the diagrams of the threshold network 43 to be used respectively in connection with the two embodiments of my invention. The threshold shown in Fig. 3a is adapted to transmit only those impulses that correspond to the gamma rays of energies less than 1.2 mev. and is to be used in conjunction with a source 37 of gamma rays such as $Co^{60}$ emitting gamma rays of 1.2 mev. As shown in Fig. 3a one of the input terminals 42 is grounded and the other input terminal is connected to the primary windings 91 and 92 of a transformer 93, said windings being arranged in opposition.

The ungrounded input terminal is connected to the winding 92 through a resistor 94 and to the winding 91 through a channel comprising a rectifier 95 in series with a battery 96. The secondary winding 97 of the transformer 93 is connected to the output terminals 44.

The voltage of the battery 96 is arranged to oppose the voltage across the input terminals 42. Thus whenever a pulse exceeding a certain threshold value (corresponding to the energy of 1.2 mev.) appears across the terminals 42 we obtain a current flowing through the rectifier 95 and the winding 91 to the ground terminals in the direction of the arrow A and another current simultaneously flow through the resistor 94 and the winding 92 to the ground in the direction of the arrow B. These two currents produce fluxes in the opposite directions in the primary of the transformer 93 and therefore no voltage appears across the output terminals 44.

On the other hand, whenever the pulse applied to the input terminals 42 is below said threshold value, the opposing voltage of the battery 96 exceeds the voltage provided by the pulse and therefore no current can flow through the rectifier 95 in the direction of the arrow A and the winding 91 is de-energized. However, a current flows through the resistor 94 and the winding 92 in the direction of the arrow B and this current induces a voltage across the output terminals 44 of the transformer 93. It is thus apparent that the network shown in Fig. 3a transmits only those impulses that are below a certain threshold value, said threshold value being determined by the battery 96.

The threshold network shown in Fig. 3b is adapted to transmit only those impulses that correspond to gamma rays of energies above 2.5 mev. and is to be used in conjunction with a source 37 consisting of a neutron-beryllium mixture. As shown in Fig. 3b the threshold channel comprises a battery 80 in series with a rectifier 81 and resistors 82 and 83 interposed between the input terminals 42. The output terminals 44 of the threshold network are applied to the resistor 82. The voltage of the battery 80 is so arranged as to oppose the voltage across the input terminals 42. If the voltage across the input terminals 42 is smaller than the opposing voltage of the battery there is no current in the circuit because of the unidirectional action of the rectifier 81. However, if the voltage impulses across the input terminals 42 exceed the voltage of the opposing battery 80 we obtain a current that is transmitted through the rectifier 81 and causes a corresponding voltage across the output terminals 44 of the resistor 82. The voltage of the battery 80 determines the threshold and thus only the voltage impulses exceeding the threshold appear across the output terminals 44. On the other hand, the voltage impulses at the input terminals 42 that are below the threshold are not transmitted because of the unidirectional conductivity of the rectifier 81.

Figs. 4, 5, and 6 show some applications of my invention to non-destructive testing. The testing instrument shown in these figures is contained in a box or casing 100. Within the casing 100 a source 101 of gamma rays such as $Co^{60}$ is placed adjacently to a scintillation counter comprising a crystal 102 which scintillates when intercepted by gamma rays and actuates the photomultiplier 103. The crystal is of relatively large size so as to absorb completely the intercepted gamma rays and consequently, we obtain across the output terminals of the photomultiplier 103 a succession of impulses having magnitudes representing energies of the intercepted photons. Some of these photons arrive directly from the source 101 and have the energy of 1.2 mev. The remaining photons that intercept the crystal 102 are scattered by the surrounding medium and have energies less than 1.2 mev. The output impulses from the photomultiplier 103 are transmitted through a threshold network 104. The threshold network is of the type shown in Fig. 3a, i.e. it transmits only those impulses that correspond to energies less than 1.2 mev. Thus the impulses transmitted by the network 104 correspond only to those photons that have been scattered by the surrounding medium. These impulses are in turn transmitted to a rate measuring network 105. The output of 105 is in turn applied to the indicator 106.

Fig. 4 shows the application of my invention to the determination of the thickness $l$ of a plate 110 from one side only without any necessity for obtaining access to the other side of the plate. Such a measurement can be used either inside or outside of steel tubing or other similar forms and can be rapid and easily performed. The principle of this measurement is based on the well known physical principle that radiation passing through matter will be scattered and the amount of radiation scattered will increase with the amount of matter traversed. Thus the gamma rays from the source 101 are scattered by the plate 110 and the amount of scattered radiation is proportional to the material traversed, i.e. to the thickness of the sheet 110. Thus the indication of the meter 105 represents the thickness of the plate 110 and if the indication varies it will indicate corresponding variations in the thickness.

Fig. 5 represents the application of my method to the determination of the level of liquid in oil tanks. Let 111 designate an oil tank which is filled to the level CD with oil, said level being at a height H. It is desired to produce a signal whenever the oil reaches the level AB at a height H. This is accomplished by means of the instrument which is fastened to the outside wall of the tank at the level H as shown in Fig. 5. It is apparent that the meter 106 indicates radiations that are scattered not only by the wall of the tank adjacent to the instrument, but also rays that are scattered by the oil within the tank. If the liquid level is at a height H which is below the critical height H the scattering of the gamma rays takes place in the wall of the tank and in the air within the tank. Because of the low density of air the scattering is relatively small and the meter 106 indicates a low reading. However, when the liquid level reaches the height H the amount of the scattered radiation as indicated by the meter 106 is considerably increased.

Fig. 6 shows the application of my invention to the determination of the density of a fluid passing through pipe 112. The measuring instrument is placed outside of the pipe and the radiation from source 101 is scattered by the wall of the pipe and by the fluid within the pipe. It is apparent that the amount of scattered radiation is higher for fluid of high density and consequently the indication of the meter 106 can serve to measure the density of the fluid within the pipe.

Fig. 7 shows an improved arrangement (that can be used instead of the arrangement 39 of Fig. 2) for detecting gamma rays and for producing current impulses having magnitudes proportional to the energy of the gamma rays. The detecting element in Fig. 7 consists of a plurality of crystals of which one is designated as the central crystal and is completely surrounded by the remaining crystals designated as peripheral crystals. The crystals may be sodium iodide or anthracene or of any other substance that is adapted to emit light under the effect of ionizing radiation. In Fig. 7 the central crystal 200 is almost completely surrounded by the peripheral crystals 201 and 202. The crystal 200 is surrounded by a reflector 210 that in combination with the light pipe 211 directs any light that is produced in this crystal 200 to the photomultiplier tube 212. Similarly, the crystals 201 and 202 are respectively surrounded by reflectors 213, 214 which direct light produced in said crystals to the photomultipliers 216 and 217, respectively. The crystals 200, 201, and 202 are optically insulated one from the other by means of an opaque partition 218 in such a manner that light produced in one of the crystals cannot be transmitted to any of the other crystals.

The output terminals of the photomultipliers 212 and 216 are applied to a coincidence network 219 by means of leads 220 and 221, respectively, and are also applied to an adder 222 by means of leads 223 and 224, said adder being actuated by the coincidence network 219 through leads 225. The adder 222 is adapted to produce across its output leads 250 an impulse which is equal to the sum of impulses derived from the photomultipliers 212, 216. Normally the adder 222 is inoperative and becomes actuated only when the impulses derived from the photomultiplier 212, 216 occur in coincidence.

The output terminals of the photomultipliers 212 and 217 are applied to a coincidence network 227 by means of leads 228 and 229, respectively, and are also applied to an adder 230 by means of leads 231 and 232, said adder being actuated by the coincidence network 227.

Similarly, the output terminals of all three photomultipliers 212, 216, and 217 are applied to a triple coincidence network 234 by means of leads 235, 236, and 237, respectively, and are also applied to an adder 238 by means of leads 239, 240, and 241, said adder being actuated by a coincidence network 234 through leads 242.

Consider now an incoming photon that interacts with the central crystal 200. Such an interaction may consist of a photoelectric effect, a Compton scattering, or a pair formation. Assume that the incoming photon has energy in the range between 0.5 mev. and 2.5 mev. In this energy range, the pair formation is negligible and therefore need not be considered. The photoelectric effect can also be neglected particularly if the crystal comprises elements of low atomic number (such as anthracene). Consequently, the only phenomenon to be accounted for is the Compton scattering. The Compton scattering is essentially a collision of the incoming photon with one of the orbital electrons, that is assumed to be free. As shown in Fig. 8, the first collision takes place at the point A and the path of the incoming photon arriving at the point A is indicated by a dashed line. As a result of this collision, a portion of the energy of the incoming photon is given to the electron and the remainder of the energy is carried off by the scattered photon. The path of the scattered photon leaving the point A is indicated by a dashed line whereas the path of the recoil electron leaving the point A is indicated by a solid line. The recoil electron has acquired a certain portion of the energy of the incoming photon and dissipates this energy by ionizing and exciting the atoms of the crystal. This energy is converted into a light pulse and the magnitude of this pulse is proportional to the energy of the recoil electron. Consequently, the light pulse produced in the crystal as a result of the first Compton scattering is not equal to the total energy of the incoming photon, but only to the portion of this energy that has been contributed to the ejected electron.

As stated above, as a result of the first collision, the incoming photon contributes to the ejected electron a portion of its energy and the remainder of the energy of the incoming photon is carried away by the scattered photon. Assume now that the second scattering occurs within the crystal 200 at a point B, i.e. the scattered photon collides with another electron within the crystal 200. The same process is repeated, i.e. a portion of the scattered photon is applied to the ejected electron and the remainder of the energy is carried by the scattered photon. The electron ejected at the point B produces a light flash the intensity of which is proportional to the energy of the electron ejected at B.

The photon undergoes successive collisions at points C, D, etc. At each of these points it releases an electron that carries off a portion of its energy. The paths of the electrons ejected during these multiple collisions are designated by solid lines and the paths of the scattered photons are designated by dashed lines. After such multiple collisions the energy of the photon becomes considerably degraded and for all practical purposes we may assume the energy of the original photon has been used up entirely to eject electrons at points A, B, C, etc., each of said electrons producing a light impulse the intensity of which is proportional to its energy. All these light impulses occur simultaneously and are transmitted through the light pipe 211 to the photosensitive surface of the photomultiplier 212 (as shown in Fig. 7). Thus the photomultiplier 212 receives a total light impulse that is proportional to the total energy of the incoming photon, and produces across its output terminals a current impulse having magnitude that is proportional to the energy of said incoming photon.

It is thus apparent that the crystal 200 in conjunction with the photomultiplier 212 produces pulses proportional to the energy of incoming photons. In order to establish such a proportionality it is necessary that the energy of the incoming photon be completely absorbed within the crystal. This can be accomplished by taking a relatively large crystal so that all the points such as A, B, C, etc. at which electrons are released during the multiple collisions, are contained within the crystal. On the other hand, however, by increasing the size of the crystal we decrease its transparency and this in turn impairs the proportionality in the detector output.

Furthermore, even if we chose a very large crystal we will never have the assurance that each photon will lose all its energy within the crystal. A relatively common occurrence is illustrated in Fig. 8 in which the incoming photon interacts initially at a point M in the crystal 200 and ejects an electron to which it imparts a portion of its energy. However, the remainder of the energy is carried off by the scattered photon which escapes from the central crystal 200 and loses its energy in multiple collisions at points N, O, P, R within the adjoining crystal 201. Consequently, we obtain two simultaneous light pulses. One pulse occurs in the crystal 200 in the neighborhood of the point M and actuates the photomultiplier 212. The current impulse across the output terminals of the photomultiplier 212 represents therefore the portion of the photon energy that has been communicated to the Compton electron ejected at the point M. The other pulse occurs in the crystal 201. This other pulse consists of a superposition of pulses occurring simultaneously in the vicinity of points N, O, P, R. These pulses act on the photomultiplier 216 and produce a current impulse across its output terminals, said current impulse representing the sum of the energies of Compton electrons ejected at points N, O, P, R in the crystal 201. It is thus apparent that the sum of the impulses across the output terminals of the photomultipliers 212 and 216 represents the total energy of the incoming photon since it is equal to the sum of the energies transferred to Compton electrons at the points M, N, O, P, R.

Another situation may occur when the incoming photon undergoes its first collision at the point T in the crystal 200 and ejects a Compton electron which is only partly absorbed in the crystal 200. This electron leaves the crystal 200 and dissipates the rest of its energy in the crystal 201. The scattered photon emitted at the point T undergoes the second and third scattering at the points V and W and consequently it dissipates its energy in the crystal 201. Thus the sum of impulses across the output terminals of the photomultiplier 212 and 216 represents the total energy of the incoming photon.

Consider now again the diagram of Fig. 7. The incoming photons are intercepted by one or more crystals thus releasing Compton electrons. The Compton electrons produce light flashes thus causing current impulses to appear in the output of one or more photomultipliers. If the incoming photon is completely absorbed within the crystal 200 as shown in Fig. 8 a pulse appears across the output terminals of the photomultiplier 212, the magnitude of said pulse representing the energy of said photon. However, if the incoming photon undergoes only its first collision in the crystal 200 and the remaining collisions take place in the crystal 201, then two impulses appear simultaneously across the outputs of the photomultipliers 212 and 216. These impulses are applied to the coincidence network 219 and to the adder 222. The adder is normally inoperative and becomes operative only if actuated by the current from the output terminal of the coincidence network 219. Since the two impulses arrive in coincidence they actuate the coincidence network 219 which in turn actuates the adder 222 and consequently we obtain across the output terminals 250 of the adder the current representing the sum of these two impulses. Thus the current across the output terminals 250 represents the energy of the incoming photon.

It is thus apparent that whenever an incoming photon is completely absorbed by the crystal 200 we obtain across the terminals 251 of the photomultiplier 212 a current impulse having magnitude representing the energy of said photon. Whenever an incoming photon is partly absorbed in the crystal 200 and partly in the crystal 201 we obtain across the terminals 250 of the adder 222 a pulse having magnitude representing the energy of said photon. By means of arguments similar to those used above, it can be shown that whenever an incoming photon is partly absorbed in the crystal 200 and partly in the crystal 202 two current impulses appear in coincidence across the output terminals of the photomultipliers 212 and 217. These impulses actuate the coincidence network 227 which in turn actuates the adder 230 and we thus obtain across the output terminals 253 of the adder a current, the magnitude of which represents the energy of the incoming photon.

In some instances the incoming photon may undergo multiple collisions in crystals 200, 201, and 202, and therefore we obtain simultaneous pulses in each of these crystals and the total energy released by these three pulses represents the energy of the incoming photon. Under these conditions, the photomultipliers 212, 216 and 217 are simultaneously actuated. The outputs of these photomultipliers are applied to a triple coincidence network 234 through channels 235, 236, and 237, respectively, said network being provided with an output channel 242. Furthermore, the outputs of these photomultipliers are respectively applied to the adder 238 through the channel 235 in series with 241, the channel 236 in series with 239, and the channel 237 in series with 240, respectively. Consequently, whenever light pulses appear simultaneously in the crystals 200, 201, and 202, the coincidence network 234 produces a pulse across its output terminals 242, and this pulse in turn actuates the adder 238. We thus obtain across the output terminals 257 of the adder 238 a pulse having magnitude equal to the sum of the impulse applied to its input terminals 239, 240, and 241. It is apparent that the pulse produced by the adder represents the magnitude of the photon which interacted with the crystals 200, 201, and 202.

Each of the leads 250, 251, 253, and 257 is applied to the input terminals 255 of the multichannel pulse analyzer 256, which is adapted to separate the pulses in various groups in accordance with their magnitudes. For a description of a pulse height analyzer see, for instance, an article by C. W. Johnstone, "A New Pulse-Analyzer Design," Nucleonics, January 1953, pp. 36–41 to U.S. Patent 2,642,527 issued to G. G. Kelley.

Consider now Fig. 9 representing a modified embodiment of a proportional gamma ray counter. The portion of Fig. 9 comprising crystals 200, 201, 202 photomultipliers 212, 216, 217 and associated equipment is identical to the corresponding portion of Fig. 7. Those elements that are the same in Fig. 7 and Fig. 9 have been designated in both figures by the same numerals. Referring now more particularly to Fig. 9 the outputs of the photomultipliers 212, 216 are applied to a coincidence network 300, said network having its output terminals connected by means of lead 301 to a controllable channel 302. Similarly, the outputs of photomultipliers 212, 217 are applied to a coincidence network 303, said network having its output terminals connected through leads 304 to said controllable channel 302.

The controllable channel 302 has its input terminals connected to the output of the photomultiplier 212 and has its output terminal connected to a multichannel pulse height analyzer 310. Under ordinary operating conditions the channel 302 is operative, i.e. a voltage applied to the input terminals 311 is transmitted to the output terminals 312. However, the channel is not operative whenever either of the coincidence networks 300, 303 is energized.

It is apparent that some of the gamma rays intercepted by the crystal 200 are completely absorbed within said crystal, i.e. all the points of multiple scattering such as A, B, C, D in Fig. 8 are located within the crystal. In such case the light emitted by the crystal represents the total energy of the incident gamma ray. This light pulse actuates the photomultiplier 212 while the remaining photomultipliers 216 and 217 remain inactive. Therefore the pulse appearing across the terminals of the photomultiplier 212 represents the energy of the incoming gamma ray, and whenever such a pulse appears there are no coincident pulses across the outputs of either of the photomultipliers 216 or 217. Consequently, neither of the coincidence networks 300 and 303 is energized and thus the pulse from the output of the photomultiplier 212 is transmitted through the channel 302 to the pulse height analyzer 310.

Consider now the gamma rays that are only partly absorbed within the crystal 200. An example of such an incident gamma ray is shown in Fig. 8 in which the gamma ray undergoes only one scattering at the point M in the crystal 200 since after the first scattering it escapes from the crystal 200 and undergoes all successive collisions at the points N, O, P, R in the crystal 201. Such a gamma ray releases only a portion of its energy within the crystal 200 and therefore the resulting pulse appearing in the output of the photomultiplier 212 is not indicative of the energy of the incident gamma ray. The purpose of this arrangement is therefore to eliminate from recording any incident gamma ray that is only partly absorbed in the crystal 200. Since the crystal 200 is entirely surrounded by the crystals 201 and 202 any photon which is only partly absorbed in the crystal 200 loses the rest of its energy in one of the adjoining crystals 201 or 202. This is illustrated in Fig. 8 in which the incoming photon following the trajectory M, N, O, P, R is partly absorbed in the crystal 200 and partly in 201. It is apparent that in such case two current impulses appear in coincidence across the output terminals of the photomultipliers 212 and 216. Consequently, the coincidence network 300 is actuated and a pulse appears across the leads 301. This pulse is applied to the controllable channel 302 and interrupts the connection between the leads 311 and 312. Thus no impulse is transmitted from the photomultiplier 212 to the multiple pulse height analyzer 310.

Similarly, whenever an incoming photon is only partly absorbed in the crystal 200 and loses the remainder of its energy in the crystal 202, we obtain coincident light pulses in the crystals 200 and 202 which in turn energize the photomultipliers 212 and 217 and the coincidence network 303. The coincidence network produces a pulse across its output leads 304 which in turn is applied to the controllable channel 302 and interrupts the connection between the leads 311 and 312. Thus no impulse is transmitted from the photomultiplier 212 to the multiple pulse height analyzer 310.

It is thus apparent that I have provided a scintillation counter that responds to those photons that are completely absorbed within the crystal 200 and does not respond to those photons that are only partly absorbed within the crystal 200.

It is apparent that I can apply the principles of my invention to a neutron counter by utilizing in the arrangements of Fig. 7 and Fig. 9 a crystal made of elements having a low atomic number such as anthracene. As is well known, a neutron interacting with a crystal undergoes a multiple collision somewhat similar to the one illustrated in Fig. 8. Therefore it can be entirely absorbed in the crystal 200 or only partly absorbed in the crystal 200, the remainder of the neutron energy being absorbed in one of the adjoining crystals 201 or 202. Thus the diagram of Fig. 7 and Fig. 9 can be applied to neutron detection as well as to gamma ray detection. In considering the interaction of neutrons in matter, we should keep in mind that the multiple collisions such as illustrated in Fig. 8 are the collisions of a neutron with the photon, and as a result of each collision the photon acquires kinetic energy that is dissipated in ionization and excitation and produces a light impulse. Thus I have provided a scintillation counter that is adapted to produce current impulses representing the energies of incoming neutrons.

Consider now Fig. 10a showing diagrammatically an adder such as the one designated by the numeral 222 in Fig. 7, said adder being comprised in Fig. 10a within a dotted rectangle. The purpose of the adder is to produce across the output terminals 250 a voltage representing the sum of the input voltages applied across the leads 223 and 224. Furthermore, the adder should be effective only whenever a voltage appears across the control leads 225. The voltages applied across the leads 223, 224 are applied to the transformers 500 and 501. The secondary windings of these transformers are connected in series and therefore the voltage across the leads 502 is equal to the sum of the voltages across the input terminals 223 and 224. The voltage across the leads 502 is in turn applied to the primary winding of a transformer 503, the secondary winding of said transformer having its terminals connected to the grids of triodes 504 and 505. The triodes have their plates connected to the primary winding of a transformer 506, said transformer having its secondary winding connected to the output terminals 250. We have thus a push pull amplifier which under normal operating conditions is biased to cut off by means of a battery 507. The control voltage across the terminals 225 is arranged to oppose the biasing battery 507. Consequently no signal is transmitted from the channel 502 to the output channel 250 because of the biasing effect of the battery 507. However, whenever a voltage appears across the control terminals 225 the push pull arrangement becomes effective to transmit the signal from the channel 502 to the output terminals 250 and we obtain thus across the output terminals 250 a voltage representing the sum of voltages applied across the output channels 224 and 223.

Figure 10B:
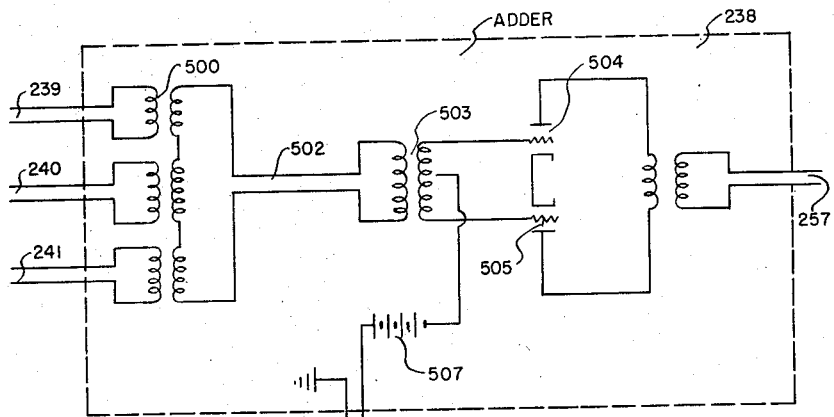

Fig. 10b represents schematically the adder such as the one designated as 238 in Fig. 7. The operation of the adder 238 is identical to the adder 222 and it is self-explanatory since the elements that are the same in both adders have been designated by the same numerals in Figs. 10a and 10b. The main difference between Figs. 10a and 10b is that in Fig. 10b it is desired to add the impulses at the three input terminals 239, 249, and 241 whereas in Fig. 10a it is desired to add impulses across the two input terminals 224 and 223. In Fig. 10a the voltage representing the sum of the three input impulses appears across the output terminals 257 of the adder, and is operative only whenever a control voltage appears at the terminals 242.

Figure 11:
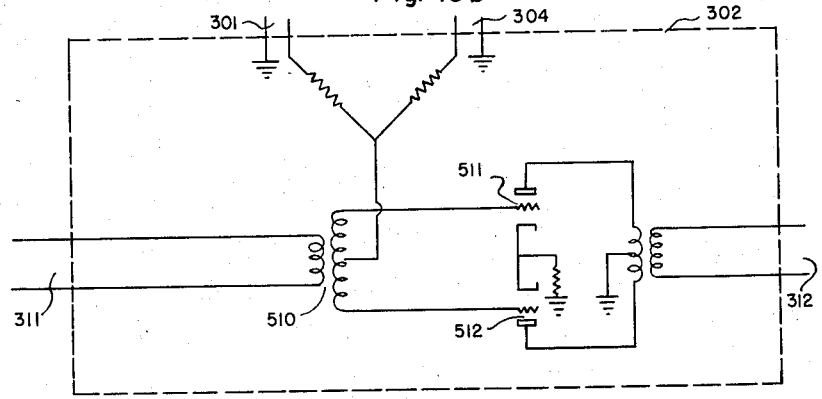
Fig. 11 shows diagrammatically a controllable channel that is a part of the arrangement of Fig. 9.

Fig. 11 represents diagrammatically the controllable channel such as designated as 302 in Fig. 9, said channel being provided with input terminals 311, output terminals 312, and control terminals 301 and 304. Under normal operating conditions a voltage applied to the input terminals 311 appears across the output terminals 312 and the connection between the input channel and the output channel is interrupted only if a voltage appears at either of the control channels 301, 304. As shown in the figure, the input terminals 311 are connected to the primary winding of the transformer 510 and the secondary winding of the transformer 510 is connected to the grids of the triodes 511 and 512 arranged in push pull.

Under normal operating conditions, in the absence of voltage at either of the control terminals 301, 304, the voltage applied to the input terminals 311 is transmitted through the transformer 510 and the push pull circuit to the output terminals 312. However, whenever a control voltage appears at either of the terminals 301, 304, it biases the amplifiers 511, 512 to the cut off, and therefore the push pull circuit disconnects the input leads 311 from the output leads 312.

I claim:

1. Radiation-detecting apparatus comprising two scintillating elements adapted to interact with incident gamma rays and to produce light flashes responsively to such interactions, the intensity of said respective flashes representing the amounts of energy absorbed in said element from said gamma rays in the course of said respective interactions, a photomultiplier for each of said scintillating elements, each of said photomultipliers being individually optically coupled to one of said scintillating elements and being adapted to produce current impulses having magnitudes respectively representing the intensity of the light flashes occurring in the scintillating element to which it is coupled, and means fed by the impulses from said photomultipliers operative selectively to add the impulses from said respective photomultipliers that occur in time coincidence and to produce therefrom new impulses having magnitudes proportional to the sums of the magnitudes of said selectively added impulses.

2. Radiation-detecting apparatus comprising two scintillating elements adapted to interact with incident gamma rays and to produce light flashes responsively to such interactions, the intensity of said respective flashes representing the amounts of energy absorbed in said element from said gamma rays in the course of said respective interactions, a photomultiplier for each of said scintillating elements, each of said photomultipliers being individually optically coupled to one of said scintillating elements and being adapted to produce current impulses having magnitudes respectively representing the intensity of the light flashes occurring in the scintillating element to which it is coupled, a coincidence network coupled to the outputs of said photomultipliers and operative to sense the simultaneous occurrence of impulses in both of said photomultipliers, and adder means controlled by said coincidence network and fed by said photomultiplier impulses operative to add the magnitudes of output impulses from said respective photomultipliers occurring in time coincidence and to produce therefrom new impulses of magnitudes proportional to the sums of the magnitudes of said time-coincident impulses.

3. The apparatus defined in claim 1 comprising also means opaque to light flashes disposed between said two scintillating elements and optically isolating the same.

4. Radiation-detecting apparatus comprising a first scintillating element, a second scintillating element largely surrounding said first element, both of said elements being adapted to interact with incident gamma-ray photons and to produce light flashes responsively thereto, the intensity of said respective light flashes in each of said elements representing the quantity of energy absorbed therein from said photons pursuant to said respective interactions, said first and second elements being separated by a layer of material opaque to light flashes, photomultiplier means coupled individually to each of said elements, each of said photomultiplier means being adapted to produce current impulses having magnitudes proportional to the intensity of light flashes in its associated scintillating element, means fed by the outputs of said respective photomultiplier means for selectively adding impulses occurring simultaneously at the outputs of both of said photomultipliers and producing therefrom new impulses having magnitudes proportional to the sums of the magnitudes of said time-coincident impulses, and means for selectively transmitting said new impulses and said output impulses from the photomultiplier coupled to said first scintillating element.

5. Radiation-detecting means comprising a first radiation-sensitive element operative to produce a series of energetic physical events responsively to interactions with gamma-ray photons, a second radiation-sensitive element of like properties, said second element being positioned relative to said first element to provide a substantial probability that photons scattered from said first element will enter and interact with said second element, each individual energetic physical event produced in said elements being respectively proportional in some physical property to the quantity of energy absorbed by such element in the course of the gamma-ray interaction producing it, individual detector means for each of said radiation-sensitive elements operative to sense the occurrence of said energetic physical events and to produce electrical impulses substantially coincident in time with said events and having magnitudes proportional to the respective values of said physical property, and means fed by said impulses from both of said detector means operative to add the impulses from said detector means that occur in time coincidence and to generate new impulses having magnitudes respectively proportional to the sum of the magnitudes of said added impulses, said new impulses representing the energies of gamma rays interacting first in one of said elements, scattering into the other of said elements, and thereupon interacting in said other element.

6. Radiation-detecting means comprising a first radiation-sensitive element operative to produce a series of energetic physical events responsively to interactions with gamma-ray photons, a second radiation-sensitive element of like properties, said second element being positioned relative to said first element to provide a substantial probability that photons scattered from said first element will enter and interact with said second element, each individual energetic physical event produced in said elements being respectively proportional in some physical property to the quantity of energy absorbed by such element in the course of the gamma-ray interaction producing it, individual detector means for each of said radiation-sensitive elements operative to sense the occurrence of said energetic physical events and to produce electrical impulses substantially coincident in time with said events and having magnitudes proportional to the respective values of said physical property, and means fed by said impulses from both of said detector means operative to add the impulses from said detector means that occur in time coincidence and to generate new impulses having magnitudes respectively proportional to the sum of the magnitudes of said added impulses, said new impulses representing the energies of gamma rays interacting first in one of said elements, scattering into the other of said elements, and thereupon interacting in said other element, said last-mentioned means being operative to suppress all other impulses fed to it by said respective detector means.

7. Radiation-detecting means comprising a first radiation-sensitive element operative to produce a series of energetic physical events responsively to interactions with gamma-ray photons, a second radiation-sensitive element of like properties, said second element being positioned relative to said first element to provide a substantial probability that photons scattered from said first element will enter and interact with said second element, each individual energetic physical event produced in said elements being respectively proportional in some physical property to the quantity of energy absorbed by such element in the course of the gamma-ray interaction producing it, individual detector means for each of said radiation-sensitive elements operative to sense the occurrence of said energetic physical events and to produce electrical impulses substantially coincident in time with said events and having magnitudes proportional to the respective values of said physical property, and time-selective means fed by said impulses from both of said detector means operative to produce and selectively transmit resultant electric impulses only in response to reception of electric impulses from both of said detectors in substantial time coincidence, each of said resultant impulses having magnitude proportional to the sum of magnitudes of said coincidentally occurring impulses.

8. Radiation-detecting apparatus comprising two scintillating elements adapted to interact with incident gamma rays and to produce light flashes responsively to such interactions, the intensity of said respective flashes representing the amounts of energy absorbed in said respective elements from said gamma rays in the course of such interactions, a photomultiplier for each of said scintillating elements, each of said photomultipliers being individually optically coupled to its associated scintillating element and being adapted to produce electric impulses having magnitudes respectively representing the intensity of the light flashes occurring in said associated scintillating element, and means fed by the impulses from both of said photomultipliers operative selectively to add the impulses from said respective photomultipliers that occur in time coincidence and to produce therefrom and selectively transmit new impulses having magnitudes proportional to the sums of the magnitudes of said selectively added impulses, said last-mentioned means being also operative to suppress all other impulses fed to it by said photomultipliers.

9. Radiation-detecting apparatus comprising two scintillating elements adapted to interact with incident gamma rays and to produce light flashes responsively to such interactions, the intensity of said respective flashes representing the amounts of energy absorbed in said element from said gamma rays in the course of said respective interactions, a photomultiplier for each of said scintillating elements, each of said photomultipliers being individually optically coupled to one of said scintillating elements and being adapted to produce current impulses having magnitudes respectively representing the intensity of the light flashes occurring in the scintillating element to which it is coupled, and means fed by the impulses from said photomultipliers operative selectively to add the impulses from said respective photomultipliers that occur in time coincidence and to produce therefrom new impulses having magnitudes proportional to the sums of the magnitudes of said selectively added impulses, said last means being also operative to transmit impulses produced by one of said photomultipliers that are not in coincidence with the impulses produced by the other of said photomultipliers and to suppress impulses produced by said other photomultiplier that are not in coincidence with impulses produced by said one photomultiplier.

10. Radiation-detecting means comprising a first radiation-sensitive element operative to produce a series of energetic physical events responsively to interactions with gamma-ray photons, a second radiation-sensitive element of like properties, said second element being positioned relative to said first element to provide a substantial probability that photons scattered from said first element will enter and interact with said second element, each individual energetic physical event produced in said elements being respectively proportional in some physical property to the quantity of energy absorbed by such element in the course of the gamma-ray interaction producing it, individual detector means for each of said radiation-sensitive elements operative to sense the occurrence of said energetic physical events and to produce electrical impulses substantially coincident in time with said events and having magnitudes proportional to the respective values of said physical property, whereby some of the impulses produced by said respective detector means occur in coincidence and other impulses produced by said respective detector means are not in coincidence, and time-selective means fed by said impulses from both of said detector means operative to add the impulses from said detectors that occur in coincidence and to generate new impulses having magnitudes respectively proportional to the sum of magnitudes of said added impulses, said new impulses representing the energies of gamma rays interacting first in one of said elements, scattering into the other of said elements, and thereupon interacting in said other element, said time-selective means being also operative to transmit selectively those impulses that are produced by one of said detector means that are not in coincidence with impulses produced by the other detector means, and to suppress impulses produced by said other detector means that are not in coincidence with impulses produced by said one detector means.

References Cited in the file of this patent

UNITED STATES PATENTS

| | | |
|---|---|---|
| 2,469,461 | Russell | May 10, 1949 |
| 2,636,993 | Jakobson | Apr. 28, 1953 |
| 2,648,012 | Scherbatskoy | Aug. 4, 1953 |
| 2,739,242 | Armistead | Mar. 20, 1956 |
| 2,740,898 | Youmans | Apr. 3, 1956 |
| 2,755,390 | Teichmann | July 17, 1956 |

OTHER REFERENCES

Two-Crystal Gamma-Ray Scintillation Spectrometer, by R. E. Connally, from The Review of Scientific Instruments, vol. 24, No. 6, June 1953, pp. 458–459.

Large-Volume Liquid Scintillators: Their Applications, by Harrison et al., from Nucleonics, vol. 12, No. 3, March 1954, pp. 44–47.